Dec. 10, 1935.  E. ROIRANT  2,023,745
DEVICE FOR THE CONTINUOUS RENEWAL OF GLASS IN A
DRAWING OFF BASIN ATTACHED TO A GLASS FURNACE
Filed Feb. 3, 1934
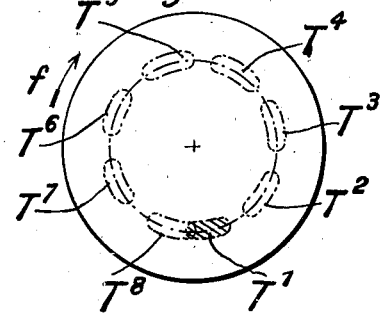
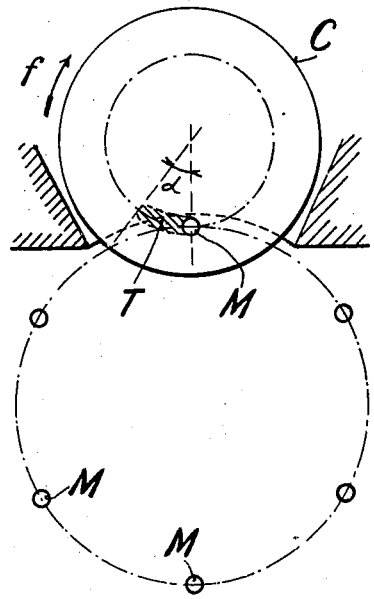
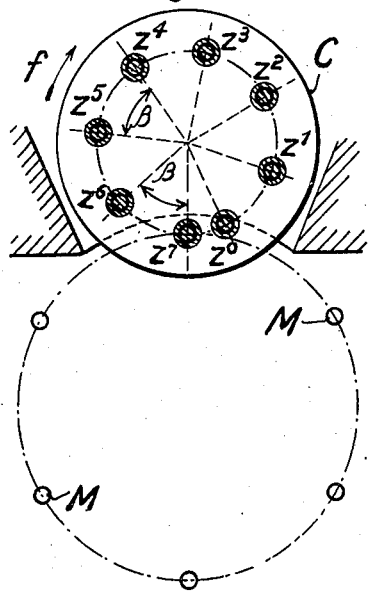
Emile Roirant
Inventor
By: Marks & Clerk
Attys.

Patented Dec. 10, 1935

2,023,745

UNITED STATES PATENT OFFICE 2,023,745

DEVICE FOR THE CONTINUOUS RENEWAL OF GLASS IN A DRAWING OFF BASIN ATTACHED TO A GLASS FURNACE

Emile Roirant, Paris, France, assignor to Société Anonyme d'Etudes et de Constructions d'Appareils Mecaniques pour la Verrerie, Paris, France Application February 3, 1934, Serial No. 709,596
In France October 14, 1933

1 Claim. (Cl. 49—56)

It is known that some glass furnaces are provided with accessory devices in which drawing off of molten glass is effected by immersion of parison moulds, which devices, for ensuring the permanent renewal of the glass, are constituted by basins supplied by the main furnace and receiving a continuous movement of rotation.

The United States patent application Serial No. 659,396 filed by the applicant on the 2nd March 1933, particularly relates to rotating basins adapted to cooperate with machines in which the parison moulds are arrested at the time of suction.

This patent application describes means by which it is possible, whilst giving to the basin reduced dimensions which are sufficient for operating with machines having an intermittent movement, to particularly ensure a satisfactory renewal and reheating of the glass brought to the suction region.

Up to now, a continuous movement of rotation was imparted to the basins used in cooperation with these machines having an intermittent movement. These operating conditions are illustrated by Figures 1 and 2 of the accompanying drawing showing a diagrammatic representation of the said devices.

In the basin C rotating continuously about its axis in the direction of the arrow $f$, there are drawn successively the molds M of a rotary machine. These molds are stationary during the drawing off operation while the basin C continues to rotate.

In these operating conditions, upon immersion of the mould brought to suction position, a small glass wave T, Fig. 1, is created in the neighbourhood of this mould, which glass wave has its origin at the rear part of the mould M, relatively to the direction of rotation of the basin.

This wave is formed in the molten glass and the mass it influences is subjected, owing to the contact with the relatively cold suction mould, a thermic alteration which is communicated to all the adjacent regions.

This cooled trail, left by each gathering mould stationary in the glass drawn along by the basin, extends over a distance corresponding to the arc of circle $\alpha$ through which the basin has moved, during the time of immersion of the mould.

It will therefore be understood as shown in Fig. 2 that after a small number of immersions performed by the moulds M in the basin, the successive areas $T^1$, $T^2$ to $T^8$ thus swept over and cooled, finally overlap and form, in the molten glass, a continuous zone which, although supplied with hot glass issuing from the furnace, remains however degraded to a certain extent.

The present invention, which is adapted to remedy this inconvenience, is illustrated diagrammatically in Fig. 3. The invention consists in imparting to the rotating basin C an intermittent movement of rotation the periods of duration and stoppage of which coincide with the durations and stoppages of the suction molds M.

Owing to this synchronism in the stoppages, the suction takes place on stationary glass and the cooling surface Z is thus limited to the surface in contact with the stationary mold or to the small and immediately adjacent zone.

It is true that, in this very reduced zone, the cooling is more intense and that the duration of exposition of the glass to the open air in the uncovered sector of the basin is longer. On the other hand, the average speed of the basin, the stoppage periods being taken into consideration, is lower than that of a basin receiving a continuous movement of rotation. The degraded glass therefore remains subjected for a longer period of time to the action of the heat of the furnace or of the calories supplied by the glass issued from the furnace in the covered and reheated portion of the basin, so that when, after a full revolution of the latter, this glass comes back to the suction point, the time necessary for its local regeneration has elapsed.

Furthermore, in the case of a basin receiving a continuous movement, see Figs. 1 and 2, owing to the fact that the cooling zones or areas move towards each other or overlap, it sometimes happens that a mould draws off glass in a zone which has been cooled by contact with a mould during the preceding revolution of the basin, so that the homogeneity of the glass thus drawn off can still be poor.

On the contrary, by imparting to the basin an intermittent movement of rotation interrupted by stoppages, it is possible, according to another feature of the invention, to choose for this movement such a law that a mass of glass cooled by the drawing off action, effected several revolutions before again becoming stationary at the suction station, so that, during all this time, this mass can regenerate. In the example, Figure 3 of the drawing, it is assumed that the basin C describes an angle $\beta$ of 48° between two successive drawing operations. Under these conditions, if $Z^0$ indicates the cooled trail left by a mold and $Z^1$, $Z^2$, $Z^3$, $Z^4$, $Z^5$, $Z^6$ the trails left during successive passages, it is obvious that the mold which arrives at the drawing moment will find non-degraded glass at $Z^7$.

With regard to the drawing operation, the zone $Z^0$ is passed on the other side of the drawing position so that the drawn glass is that which is situated between $Z^0$ and $Z^1$ and so on.

It is therefore possible by suitably choosing the value of the angle $\beta$, separating two zones $Z$, that is to say the arc described by the basin C between two stoppages, to obtain the result that a zone of glass being subjected to the effects of a drawing operation makes several revolutions before becoming stationary at the drawing station.

The intermittently rotating basin, owing, on the one hand, to the fact that the cooling action to which the glass is subjected at the suction point is localized and, on the other hand, to the fact that it is possible to prolong for a long time, practically during several revolutions of the basin, the reheating action, therefore completely fulfills the conditions necessary for drawing off glass having the desired thermic homogeneity.

The operating conditions are facilitated by the fact that, as far as intermittently operating machines are concerned, the uncovered sector can be very short relatively to the reheating sector.

The rotating basin receiving an intermittent movement can moreover be provided with devices (discharge conduit and reheating chamber) described in the above mentioned patent. The said rotating basin can also be inserted within the furnace in a recess, for instance a niche provided in the wall of the furnace.

The law of this movement is such that a mass of glass cooled by a drawing off operation effects several revolutions before again coming to rest at the drawing off station.

What I claim as my invention and desire to secure by Letters Patent is:—

A method of drawing off glass in a rotating basin supplied by a glass furnace and covered for the larger part by the hood of the furnace, said method consisting in effecting the drawing off at a fixed station by means of molds successively immobilized at this fixed point and in imparting to the said basin an intermittent movement of rotation, the law of this movement being such that a mass of glass cooled by a drawing off operation effects several revolutions before again coming to rest at the said fixed drawing off station.

EMILE ROIRANT.